Oct. 27, 1931.  D. E. SPEICHER  1,829,682
POULTRY FEEDER
Filed Jan. 3, 1929
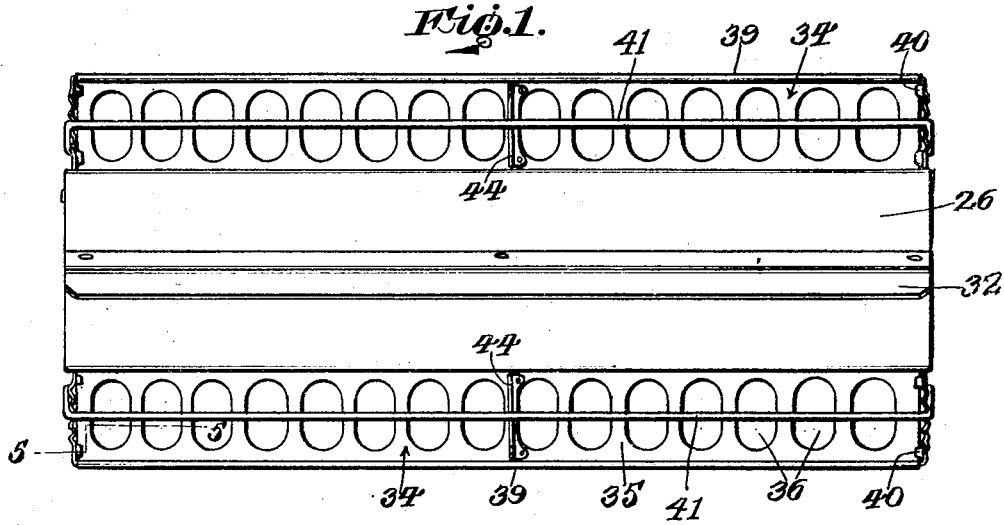
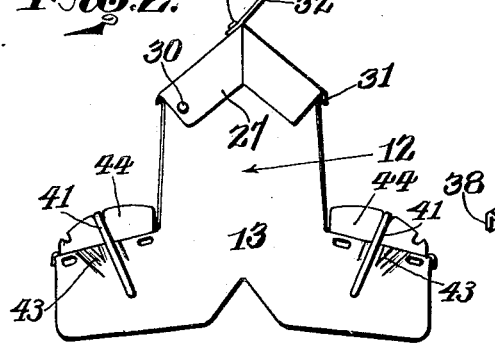
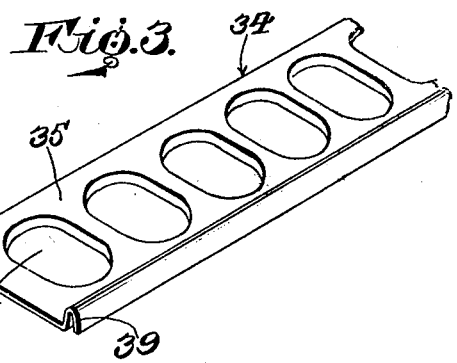
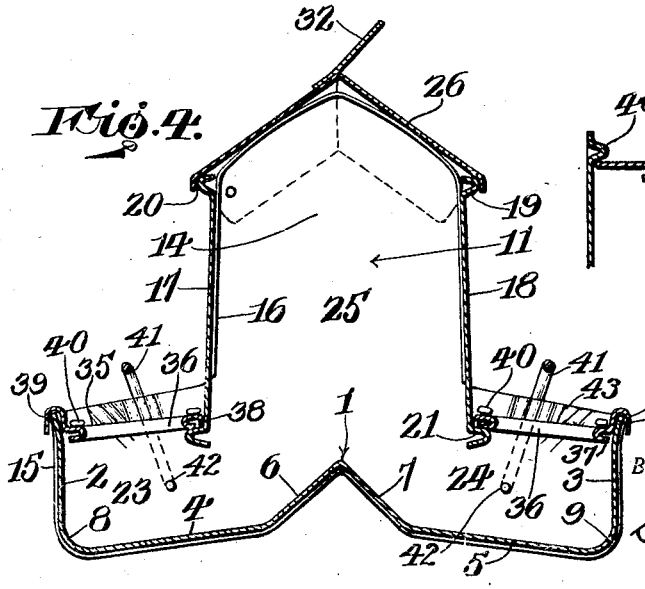
INVENTOR.
Daniel E. Speicher,
BY
Geo. P. Kimmel
ATTORNEY.

Patented Oct. 27, 1931

1,829,682

UNITED STATES PATENT OFFICE

DANIEL E. SPEICHER, OF URBANA, INDIANA, ASSIGNOR TO THE CYCLONE MANUFACTURING COMPANY, OF URBANA, INDIANA, A CORPORATION

POULTRY FEEDER

Application filed January 3, 1929. Serial No. 330,004.

This invention relates to poultry feeders, more particularly to a feeder for baby chicks, but it is to be understood that a feeder in accordance with this invention may be employed in any connection for which it is found applicable, and the invention has for one of its objects to provide, in a manner as hereinafter set forth, a feeder of such class including a new and novel form of feed grate constructed to provide a catch tray to save the feed and with the grate capable of being removed from the feeder body when occasion requires.

A further object of the invention is to provide, in a manner as hereinafter set forth, a poultry feeder including a removable feed grate to provide a catch tray to save the feed and with the body of the feeder having means for detachably securing the grate therewith when the grate is coupled to the feeder body to provide a catch tray.

A further object of the invention is to provide, in a manner as hereinafter set forth, a feeder of the class referred to having a hinged cover for the feeder body and with the cover so constructed and arranged whereby it can be expeditiously shifted on its hinge connection to permit of the convenient filling of the feeder without disconnecting the cover from the feeder body, and further with the cover provided with means to prevent the perching of fowls thereon when the cover is arranged in closure position with respect to the body of the feeder.

Further objects of the invention are to provide, in a manner as hereinafter set forth, a poultry feeder which is simple in its construction and arrangement, strong, durable, compact, thoroughly efficient in its use, readily assembled, and comparatively inexpensive to manufacture.

With the foregoing and other objects in view the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:—

Figure 1 is a top plan view of a poultry feeder in accordance with this invention.

Figure 2 is an end view thereof.

Figure 3 is a fragmentary view in perspective of the feed saving grate.

Figure 4 is a vertical sectional view of the feeder.

Figure 5 is a section on line 5—5 Figure 1.

The feeder includes a base member referred to generally at 1 and formed from a rectangular blank of sheet metal of the desired width, length and gauge. The blank 1 is stamped or otherwise acted upon to provide a pair of upstanding, outer wall forming parts 2, 3 inclining from their lower ends outwardly in opposite directions, a pair of oppositely extending bottom forming parts 4, 5 inclining downwardly in a direction towards the parts 2, 3, an inverted V-shaped portion disposed centrally of the blank and providing a pair of oppositely inclined, inner wall forming parts 6, 7 inclining towards and merging into the parts 2, 3, and a pair of rounded corner forming parts 8, 9 joining the parts 2, 3 with the parts 6, 4.

The upper terminal portion of each part 2, 3 is flared outwardly as indicated at 10.

The feeder further includes a pair of oppositely disposed, vertically extending end wall forming members referred to generally at 11, 12. Each of the members 11, 12 is formed from a sheet metal blank of the desired size. The members 11, 12 are of like construction, and but one will be described, as the description of one will apply to the other. Each end wall forming member includes a lower part 13 and an upper part 14 of less width than and disposed centrally with respect to the lower part 13. The part 13 conforms in contour to that of the base member 1 and is provided with an inturned flange 15. The base member at its ends is seated against the flanges 15 and abuts the parts 14. The flanges 15 are fixedly secured to the base member 1 in any suitable manner. The part 14 of each end wall forming member is provided with a continuous, inwardly extending edge flange 16. The flange 16 is arranged at the sides and top of the part 14. The top of the part 14 inclines downwardly in opposite direction from its vertical center. The part 14 gradually decreases in width from its point of joinder with the part 13. The top edges of the part 13 incline downwardly in opposite directions from the side edges of the part 14.

The feeder further includes a pair of side walls 17, 18 each formed from a length of sheet metal of the desired width, length and gauge. The walls 17, 18 are of like construction, but are oppositely disposed with respect to each other. The walls 17, 18 incline towards each other from the bottoms thereof. Each wall at its top is provided with a laterally extending flange or bead co-extensive therewith. The beads are indicated at 19 and each is formed by bending outwardly a marginal part of a wall and then bending such part inwardly and in a manner to provide a rounded edge 20.

The marginal portion at the bottom of each side wall is bent outwardly and bent upon itself to provide a supporting ledge 21. The walls 17, 18 are interposed between the parts 13 of the members 11, 12 and said walls 17, 18 extend above said part 13 and bear against the outer face of the flange 16 at the sides of the part 14. The walls 17, 18 are fixedly secured to the flange 16 in any suitable manner. The flanges 19 at the upper ends of the walls 17, 18 are arranged at the top of the sides of the part 14 of the end members 11, 12. The ledges 21 formed at the bottoms of the walls 17, 18 are positioned a substantial distance above the bottom edges of the part 13 and each ledge 21 is positioned between the parts 6, 7 and the parts 2, 3. The ledges 21 are also arranged slightly below, but spaced from the top edges of the parts 2, 3.

The base member 1, end wall forming members 11, 12 and walls 17, 18 provide the body of the feeder.

The body of the feeder forms a pair of open top, oppositely disposed feed containers for the fowls and a feed hopper or supply compartment common to and discharging into the containers. The containers are indicated at 23, 24 and the feed hopper or supply compartment at 25. The container 23 is provided by the part 13 of the members 11, 12 and the parts 2, 4, 6 and 8 of the base member 1. The container 24 is provided by the part 13 of the members 11, 12 and the parts 3, 5, 7 and 9 of the base member 1. The inner walls of the containers 23, 24 are provided by the wall forming parts 6, 7. The bottoms of the containers 23, 24 are provided by the parts 4, 5 of the base member 1. The outer walls of the containers 23, 24 are formed by the wall forming parts 2, 3 of the base member 1. The parts 13 of the members 11, 12 provide the end walls of the containers 23, 24.

The hopper or compartment 25 is provided by the parts 14 of the members 11, 12, the side walls 17, 18 and the upper central portions of the parts 13 of the members 11, 12. The compartment 25 is open at its top and bottom and the wall forming parts 6, 7 provide means for directing the feed from the compartment 25 into the containers 23, 24.

The open top of compartment 25 is normally closed by a hinged cover 26 which is latched when in position to close such compartment. The cover 26 is of inverted V-shaped cross section. Each end of the cover 26 is formed with a depending flange 27 of inverted V-shape. The flanges 27 are positioned to oppose the outer faces of the members 11, 12 when the cover 26 is in closed position. The flanges 27, at one end thereof, as indicated at 30 are hinged to the parts 14 of the members 11, 12 in proximity to an upper corner of said parts. The cover 26 at each side edge is formed with a depending flange 31. Each flange 31 coacts with the edge 20 of a flange 19 to provide a latch when the cover is in closed position, for detachably securing it in such position.

Projecting from the apex of the cover 26, is an angularly disposed strip 32 which acts as a means to prevent the fowls from perching on the cover. The strip 32 is secured at its lower portion by the holdfast devices 33 to one side of the cover 26 in proximity to the apex thereof.

Associated with each feed container and arranged in proximity to the top thereof is a removable feed grate formed in a manner to provide a catch tray to save the feed. The grate is referred to generally at 34 and comprises a rectangular strip 35 of sheet metal of a length to extend from member 11 to member 12 and of a width slightly less than the open top of a container. The strip 35 is formed with a series of spaced feed openings 36, preferably of oval contour disposed transversely of the strip.

The edge or wall 37 of each opening is rounded. The strip at its rear side has co-extensive therewith a vertically disposed, depending flange 38 to provide a support and, co-extensive at its outer side is formed with an upstanding flange 39 of semi-oval shape in vertical section to form a combined hanger and attaching hook for the grate. The flange 38 is adapted to seat on the ledge 21 and the flange 39 is to overlap the flared portion 10 whereby the grate is detachably connected to the body of the feeder and further positioned in proximity to the open top of a container. See Figure 4. As the grate is positioned below the open top of the container the grate provides catch trays for saving the feed.

For the purpose of detachably securing the feed grate to the feeder body, as well as for retaining the grate in set position to provide the catch trays, the parts 13 of the members 11, 12 in proximity to the top edges of said parts 13 are formed with inwardly extending, spaced lugs 40 which extend over the ends of the feed grates and detachably retain these latter in the position in which they are set. The ends of the grates are snapped under the lugs 40 when mounting within the feed containers. See Figure 4.

The feeder is illustrated as provided with adjustable guards 41 to prevent the chicks from billing. The guards as shown form part of and are claimed in my co-pending application Serial No. 330,003, filed January 3, 1929. The guards are of like construction, of inverted yoke-shape and each is formed from a length of wire of the desired rigidity. Each feed grate has associated therewith a guard. The guards are pivotally connected as at 42 to the feeder body and the latter is formed with sets of inclined grooves 43 in the parts 13 of the members 11, 12 for the purpose of retaining the guards in adjusted position. Each grate is provided at one end with an upstanding member 44 having an arcuate top edge provided with notches. The member 44 constitutes a support for a guard 41 and the notches in the top edge thereof selectively receive the guard and whereby the member 44 will support the guard in its adjusted position.

When the sides of the guards are positioned in the groove nearest the supply compartment or feed hopper when the chicks begin to feed, they eat under the guards, thus saving the feed. When the chicks are a few weeks old and begin to bill the feed, the guards are placed into the groove nearest the front of the containers and the chicks eat over the wire, thus saving the feed. The specific construction of the guards, as well as the means for retaining the same in adjusted position will be found in my co-pending application aforesaid.

It is thought the many advantages of a poultry feeder, in accordance with this invention can be readily understood, and although the preferred embodiment of the invention is as illustrated and described, yet it is to be understood that changes in the details of construction can be had which fall within the scope of the invention as claimed.

What I claim is:

1. A poultry feeder comprising a pair of oppositely disposed, open top feed containers each including end and outer side walls, a feed hopper common to said containers and including side walls each having its lower end formed with an outwardly directed ledge, a combined feed grate and catch tray forming element arranged in the top of each container between the end walls of the latter, said elements having their inner sides provided with depending flanges supported by said ledges and their outer sides formed with upstanding combined hanger and attaching means for overlapping the outer side walls of said containers whereby said elements are detachably connected to the latter, and the end walls of said containers being provided with spaced, inwardly extending lugs for overlapping the ends of said elements for retaining them in the position set within the containers.

2. In a poultry feeder a bodily removable feed grate of rectangular contour and having its inner side provided lengthwise thereof with a depending supporting flange coextensive therewith and its outer side provided with an upstanding, combined hanger and attaching means for the grate, said means being coextensive with the length of the grate.

3. In a poultry feeder a bodily removable feed grate provided lengthwise of its inner side with a vertically disposed, depending flange for seating on a part of the feeder to support the inner side of the grate, said grate further having its outer side formed with an upstanding, vertically disposed, bent-upon-itself part coextensive with the body of the grate and providing an upstanding, combined hanger and attaching means for the grate for removable connection with another portion of the feeder for coacting with the flange to maintain the grate within a feeding compartment below the top of the latter.

4. A poultry feeder comprising an open top feed container, a feed hopper leading to said container, a removable combined feed grate and catch tray forming element arranged within the container near the top thereof, said element having inherent vertically disposed means at its inner side for supporting the latter from a wall of the hopper, inwardly extending means on the end walls of the container and overlapping the ends of said element for removably retaining the latter within the container, and said element at its outer side having inherent upstanding means overlapping the outer wall of the container for detachably connecting said element to the container.

5. A poultry feeder comprising in combination an open top feed container, a feed hopper leading to said container, a removable combined feed grate and catch tray element arranged within the container in proximity to the open top of the latter, means projecting from the lower end of one of the walls of the hopper and having the inner side of said element seating thereon for supporting such side, and said element having its outer side formed with upstanding inherent means overlapping the outer wall of the container for detachably connecting said element to and for suspending its outer side within the container.

6. A poultry feeder comprising in combination an open top feed container, a feed hopper leading to said container, a removable combined feed grate and catch tray element arranged within the container in proximity to the open top of the latter, means projecting from the lower end of one of the walls of the hopper and having the inner side of said element seating thereon for supporting such side, said element having its outer side formed with upstanding inherent means overlapping the outer wall of the container for detachably connecting said element to and for suspending its outer side within the container, and the end walls of said container having inwardly extending inherent means seating on the upper face of said element at the ends of the latter for removably securing it within the container.

7. In a poultry feeder a combined feed grate and catch tray element consisting of a rectangular flat strip provided with spaced feed openings terminating adjacent the side edges of the strip, a vertically disposed rectangular flange integral with and depending from the inner side of said strip to provide a support, and a flange of semi-oval contour in vertical section and having its inner side integral with the outer side of said strip and extending upwardly from the latter.

8. In a poultry feeder a combined feed grate and catch tray element consisting of a rectangular flat strip provided with spaced feed openings terminating adjacent the side edges of the strip, a vertically disposed rectangular flange integral with and depending from the inner side of said strip to provide a support, a flange of semi-oval contour in vertical section and having its inner side integral with the outer side of said strip and extending upwardly from the latter, said flanges coextensive with the sides of said strip.

9. A poultry feeder comprising a pair of oppositely disposed open top feed containers, each including a pair of end walls and an outer side wall, a feed hopper common to said containers and including a pair of side walls, each having its lower end formed with an outwardly directed ledge, and a removable combined feed grate and catch tray forming element arranged within, at the upper portion of and between the end walls of each container, each of said elements having its inner sides free of connection to a side wall of the hopper and provided with a depending flange supported by a ledge and its outer side formed with an upstanding combined hanger and attaching means for overlapping the outer side wall of a container whereby said element is connected to the latter.

In testimony whereof, I affix my signature hereto.

DANIEL E. SPEICHER.